(12) United States Patent
Mann et al.

(10) Patent No.: US 11,663,901 B2
(45) Date of Patent: May 30, 2023

(54) PROXIMITY SEPARATION ALERT SYSTEM

(71) Applicants: Allan Mann, Orlando, FL (US); Ruby Mann, Orlando, FL (US)

(72) Inventors: Allan Mann, Orlando, FL (US); Ruby Mann, Orlando, FL (US)

( * ) Notice: Subject to any disclaimer, the term of this patent is extended or adjusted under 35 U.S.C. 154(b) by 0 days.

(21) Appl. No.: 17/520,818

(22) Filed: Nov. 8, 2021

(65) Prior Publication Data

US 2022/0157151 A1    May 19, 2022

Related U.S. Application Data

(62) Division of application No. 16/951,058, filed on Nov. 18, 2020, now Pat. No. 11,200,792.

(51) Int. Cl.
| | |
|---|---|
| *H04N 5/44* | (2011.01) |
| *G08B 21/24* | (2006.01) |
| *H04W 76/14* | (2018.01) |
| *H04W 4/80* | (2018.01) |
| *G08B 7/06* | (2006.01) |

(52) U.S. Cl.
CPC ............. *G08B 21/24* (2013.01); *G08B 7/06* (2013.01); *H04W 4/80* (2018.02); *H04W 76/14* (2018.02)

(58) Field of Classification Search
CPC .......... G08B 21/24; G08B 7/06; G08B 21/22; G08B 21/0269; G08B 21/0227; G08B 21/0266; H04W 4/80; H04W 76/14; H04W 4/023; H04W 12/126; H04W 12/63; H04W 84/18
See application file for complete search history.

(56) References Cited

U.S. PATENT DOCUMENTS

| | | | | |
|---|---|---|---|---|
| 2005/0200487 | A1* | 9/2005 | O'Donnell | G08B 21/0227 340/573.1 |
| 2005/0280546 | A1* | 12/2005 | Ganley | G08B 13/1427 340/539.23 |
| 2015/0356861 | A1* | 12/2015 | Daoura | G08B 21/0277 340/539.13 |
| 2018/0249295 | A1* | 8/2018 | Moraru | H04W 4/024 |

* cited by examiner

*Primary Examiner* — Munear T Akki
(74) *Attorney, Agent, or Firm* — Brennan, Manna & Diamond, LLC (57) ABSTRACT

A system for alerting a user when a preset distance between any of a plurality of wireless transceiver devices or a secondary client device such as a smartphone is achieved. Each of the wireless transceiver devices are pairable to each other and to the secondary client device. Each of the wireless transceiver devices may be placed on or worn by a person or object to be tracked. Once a preset distance is achieved between any of the wireless transceiver devices or between any of the wireless transceiver devices and the secondary client device, each of the wireless transceiver devices is configured to alert the user that the preset distance was breached. The system may employ a software application for coordinating the system and tracking separation and other related data collected by each of the wireless transceiver devices.

20 Claims, 5 Drawing Sheets

PROXIMITY SEPARATION ALERT SYSTEM

CROSS-REFERENCE TO RELATED APPLICATION

The present application claims priority to, and the benefit of, U.S. Provisional Application No. 62/938,129, which was filed on Nov. 20, 2019, and is a divisional application of U.S. patent application Ser. No. 16/951,058, which was filed on Nov. 18, 2020, both of which are incorporated herein by reference in their entirety.

FIELD OF THE INVENTION

The present invention generally relates to an alerting system, and more specifically to a proximity separation alerting system for preventing people, pets, and personal items from being accidently left behind or from wandering too far away. Accordingly, the present specification makes specific reference thereto. However, it is to be appreciated that aspects of the present invention are also equally amenable to other like applications, devices and methods of manufacture.

BACKGROUND

Despite being immensely careful and responsible, people may still accidently leave behind a child, pet, personal item, etc. at places. Without an alert system, the person, pet, or item may be unknowingly left behind. If left unattended in a hot car, the child or per could easily suffer serious injury or even death. Heat stroke, or hyperthermia, is the leading cause of non-car crash vehicular death in the United States for children. Children's and pet's bodies heat up much more quickly than adult humans, and cars heat up very quickly in the sun. This leaves the children and pets very vulnerable to if accidently left alone in the vehicle. Leaving behind important personal items for work or social events is less dangerous but can nevertheless be frustrating.

Car seats are designed to be installed in the back seat of most vehicles as that has been shown to be the safest place in a car in the event of an accident. Unfortunately, the back seat is not in the parent's or caregivers' line of sight, so the child is not always in the forefront of the driver's mind. When the trip is over, a sleeping child or infant will not provide any warning that they are being left behind. The parent may be easily distracted and may easily forget that the child is still locked in the car seat as they leave the vehicle. Younger children are not able to extricate themselves from the car seat or the vehicle adding to the danger. Similarly, pets and personal effects are often placed in the back seat or the trunk and are easily forgotten.

Additionally, families and other groups of people often travel to crowded places such as stores, parks, theaters, pools, recreational facilities, and the like. It is easy for family of group members to become separated in these places. Similarly, the elderly often inadvertently wander away from their residence or family when out in public. If an older person suffers from dementia or other types of memory loss, this can be catastrophic. Also, pets can escape their residence or their owners when out in public.

Further, people are always losing or misplacing their personal effects. Leaving a purse or backpack in public may not be inherently dangerous but leaves these items vulnerable for theft. The loss or these items is not only frustrating but can be expensive as well. The loss of a phone, credit cards, money, identification documents, work papers, computers, and the like can cause significant inconvenience and hardship.

In this manner, the improved alerting system of the present invention accomplishes all of the forgoing objectives, thereby providing an easy solution to prevent the separation of a child, pet, or personal effect from the parent or owner. A primary feature of the present invention a system that can tag multiple people, pets, or items simultaneously. The improved of the present invention is capable of providing tiers of warnings when a person is inadvertently separated from the child, pet, or personal effect helping protect and keep safe loved ones, pets, and important personal possessions. The invention alerts users when the child, pet, or personal effect is separated from the user more than a short distance.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a proximity separation alert system. The proximity separation alert system comprises at least one wireless transceiver device. The proximity separation alert system may further comprise a secondary client device. The secondary client device is pairable with the at least one wireless transceiver device. The secondary client device may be a smart phone, ae electronic tablet, a computer, or any other type of internet connectable device. The proximity separation alert system may further comprise a plurality of wireless transceiver devices. Each wireless transceiver device is pairable with the other wireless transceiver devices and with the secondary client device. Each of the wireless transceiver devices are configured to provide an alert when a predetermined separation distance between any two of the wireless transceiver devices or any of the plurality of wireless transceiver devices and the secondary client device occurs.

Each wireless transceiver device comprises a Bluetooth component, a processor, a memory, a battery, and at least one alerting component stored within a housing. The housing is integrateable within or attachable to a portable or wearable device such as a wristband, bracelet, key chain, watch, fob, or the like. The at least one alerting component may comprise a vibration component, an illumination component, and a speaker. Each wireless transceiver device may further comprise a temperature tracker and a global positioning system (GPS) tracker. Each wireless transceiver device may further comprise an acceleration sensor.

To use the system, a user may pair each wireless transceiver device to the other wireless transceiver devices and any secondary client device. The system may further comprise a mobile application for additionally alerting the user and storing any data collected by the wireless transceiver devices. One of the wireless transceiver devices is placed on or attached to a person, pet, or object to be tracked and a second wireless transceiver device or the secondary client device is retained by the user. If the person, pet, or object to be tracked is removed from the user by a predetermined first distance, each wireless transceiver device and the secondary client device enters a first alert mode.

In the first alert mode, the at least one alerting component provides an alert such as a vibration, a blinking light pattern, an audible noise, of a combination thereof. If the person, pet, or object to be tracked is removed from the user by a predetermined second distance, each wireless transceiver device and the secondary client device enters a second alert mode. In the second alert mode, the at least one alerting component provides an alert such as a vibration, a blinking light pattern, an audible noise, of a combination thereof that is different from the alert of the first alert mode. Additionally, the at least one alerting component provides an alert in the event of a low battery, an abnormal temperature, or a sudden acceleration or deceleration. The secondary client device may also be used to track the person, pet, or object to be tracked via GPS.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention is a wireless communication and proximity alert system may be used with or integrated into bracelets, keychains, watches phones, etc. which can be worn or carried and paired with another wireless transceiver placed on a car seat, purse, backpack, suitcase, phone, or person. The system allows multiple devices to communicate with one another via a wireless sensor, sounding an audible sound, blinking light, or other alert mechanisms should an individual separate or wander too far from the paired device. The system eliminates the worry of the loved ones wander too far, or forgetting a person, an important item, in a vehicle, hotel room, at the restaurant, or similar situations. The devices are rechargeable and can be maintained in an always on-state.

The wireless communication and proximity alert system may be used to reduce the chance an item or person is left behind in a car, at home, etc. The main body of each of a plurality of devices for use with the system may be shaped in a plurality of designs to fit the use such as bracelets, key chains, watches, or on a phone. The main body may be constructed using lightweight materials and may be waterproof and durable. The main body may contain an electronic wireless connectivity component, a battery, a light, an alarm speaker, and a vibrator. The devices are lightweight and may have soft surfaces. They are generally splash, water, and dust-proof. The devices can be worn on a wrist, attached to a pet collar, or attached to a bag in a difficult to remove fashion. They may also be easily hidden as a non-obvious wearable to prevent removal by a non-owner. The devices are ideal to keep track of a child, a pet, a group of people, an elderly person, a suitcase, a briefcase, a purse, a backpack, military units, and the like.

The batteries may be recharged via USB cable charger, dock station, or wireless charger. The wireless electronic connectivity component on one unit may be connected to another unit with the same technologies and design, or with a phone. Each device may be set to activate an alarm via a sound, the blinking light, the vibrator, or all three together when the proximity of the devices exceeds a set distance range.

Further, all the devices may be in different shapes and forms, but using the same technology, and be able to pair with like devices. The devices may always also be in an ON-state as long as they remain charged. A button on the device is used for enabling the syncing of multiple devices and changing the alert mode on each unit individually. The system can activate via Bluetooth, and other wireless components. The exact size, measurement, construction, and design specifications may vary upon further development and manufacturing. Additional features such as temperature sensor and GPS maybe added for added function when paired with a smart phone application.

Figure 1:
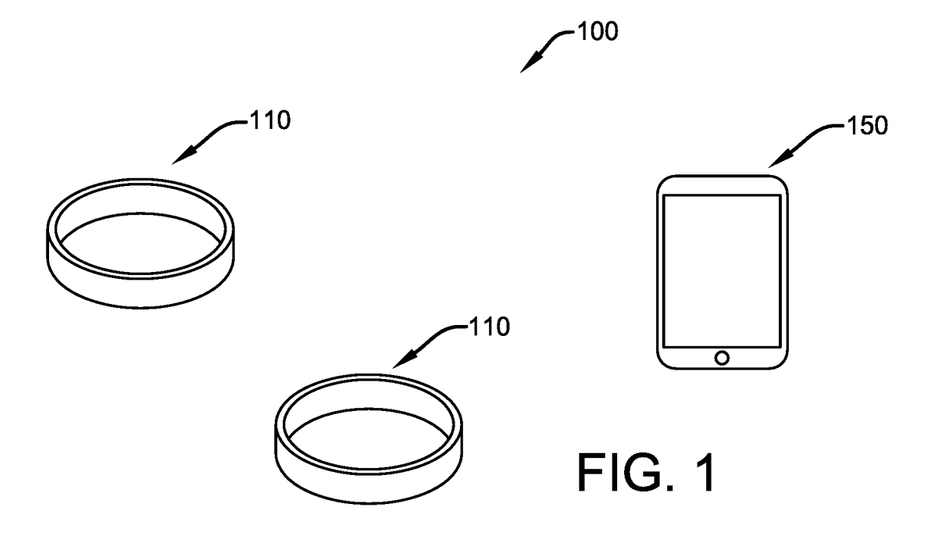
FIG. 1 illustrates a perspective view of one potential embodiment of a proximity separation alert system of the present invention in accordance with the disclosed architecture.

Referring initially to the drawings, FIG. 1 illustrates a proximity separation alert system 100. The proximity separation alert system 100 comprises at least one wireless transceiver device 110. The proximity separation alert system 100 may further comprise a secondary client device 150. The secondary client device 150 is pairable with the at least one wireless transceiver device 110 via a Bluetooth connection. The secondary client device 150 may be a smart phone, ae electronic tablet, a computer, or any other type of internet connectable device.

Figure 2:
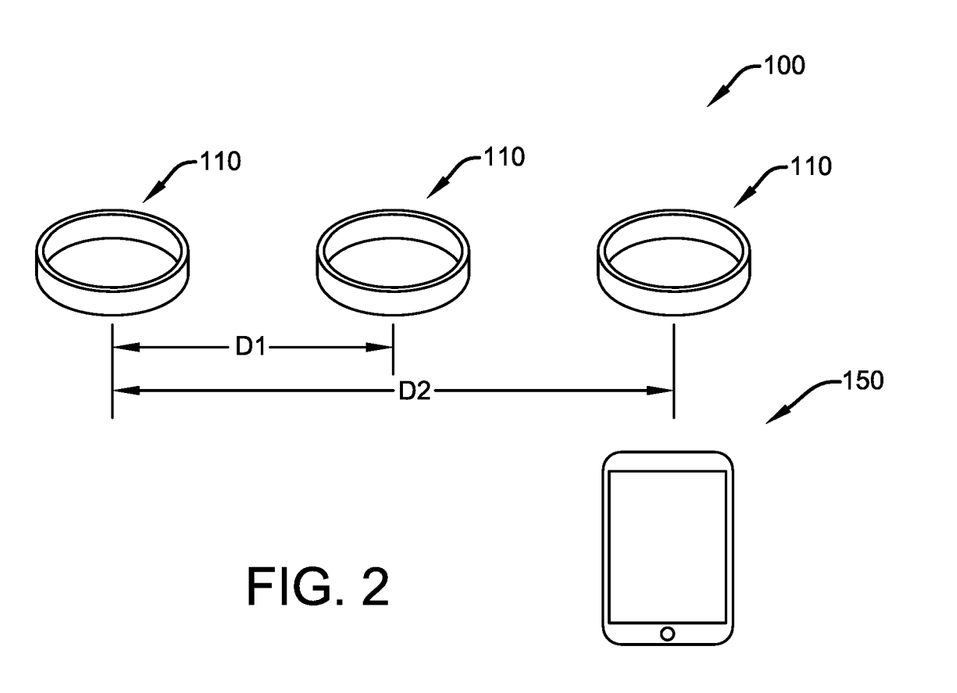
FIG. 2 illustrates a first and a second predefined distance of separation between a plurality of wireless transceiver devices and a secondary client device of the proximity separation alert system of the present invention for triggering an alert by the proximity separation alert system in accordance with the disclosed architecture.

The proximity separation alert system 100 may further comprise a plurality of wireless transceiver devices 110. Each wireless transceiver device 110 is pairable with the other wireless transceiver devices 110 and with the secondary client device 150. Each of the wireless transceiver devices 110 are configured to provide an alert when a predetermined separation distance between any two of the wireless transceiver devices 110 or any of the plurality of wireless transceiver devices 110 and the secondary client device 150 occurs. As illustrated in FIG. 2, an alert is triggered when a predetermined first distance (D1) is breached and a different alert is triggered when a second predetermined distance (D2) is breached.

Figure 5:
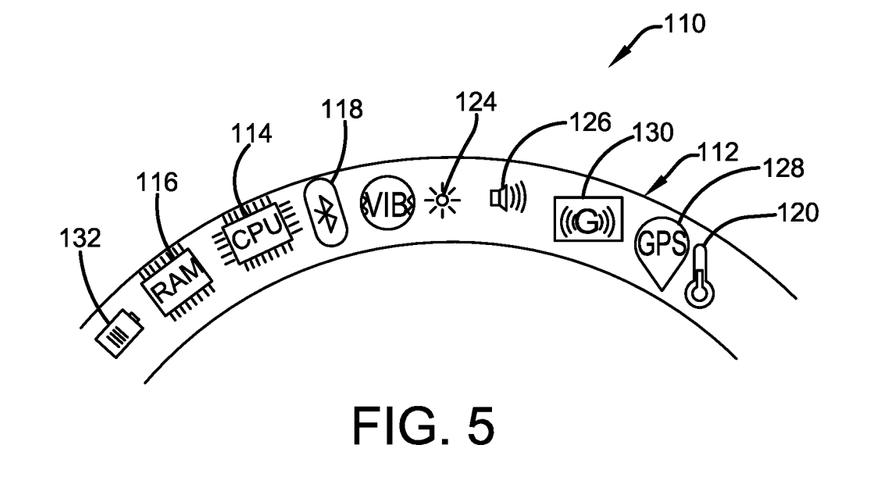
FIG. 5 illustrates a perspective cut away view of a plurality of components of each of the wireless transceiver devices of the present invention in accordance with the disclosed architecture.

As illustrated in FIG. 5, each wireless transceiver device 110 comprises a Bluetooth component 118, a processor 114, a memory 116, a battery 132, and at least one alerting component 122, 124, or 126 all stored within a housing 112. The Bluetooth component 118, the processor 114, the memory 116, the battery 132, and the at least one alerting component 122, 124, or 126 are all in electrical communication with each other. The Bluetooth component 118 may be any Bluetooth module with a chip/antenna structure capable of communicating with other devices. The memory 116 is configured to retain separation and alert data collected by the respective wireless transceiver device 110. The battery 132 is typically rechargeable via a micro-USB, docking station, wireless power station, or the like. The housing 112 is integrateable within or attachable to a portable or wearable device such as a wristband, bracelet, key chain, watch, fob, or the like. The at least one alerting component 122, 124, or 126 is configured to provide a plurality of alerts. The alerts may be a vibration, a blinking light pattern, an audible noise, or any a combination thereof.

The at least one alerting component 122, 124, or 126 may comprise a vibration component 122, an illumination component 124, and a speaker 126. The vibration component 122 may be a small vibrating motor or similar constriction capable of vibrating. The illumination component 124 is typically a LED lamp configured to illuminate in a steady state, a flash pattern, and may be any color. Each wireless transceiver device 110 may further comprise a temperature sensor 120 and a global positioning system (GPS) tracker 128 in electrical communication with the other components. Each wireless transceiver device 110 may further comprise an acceleration sensor 130 in electrical communication with the other components.

Figure 6A:
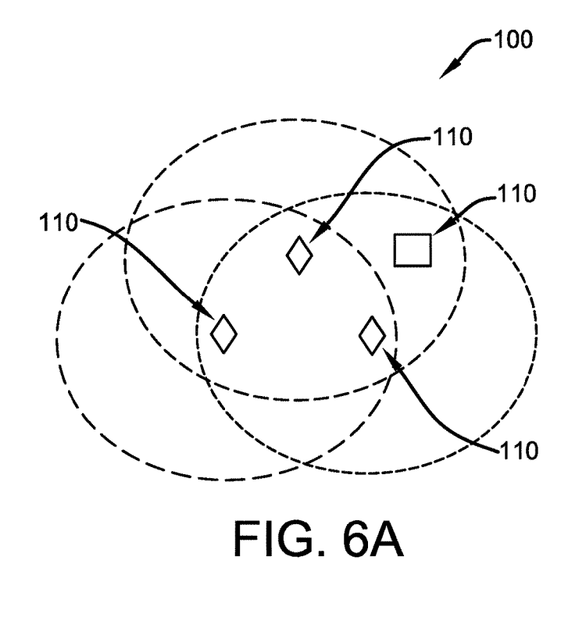
FIG. 6A illustrates a diagrammatic view of the plurality of wireless transceiver devices of the present invention where one of the wireless transceiver devices is outside of a predefined distance of the others in accordance with the disclosed architecture.
Figure 6B:
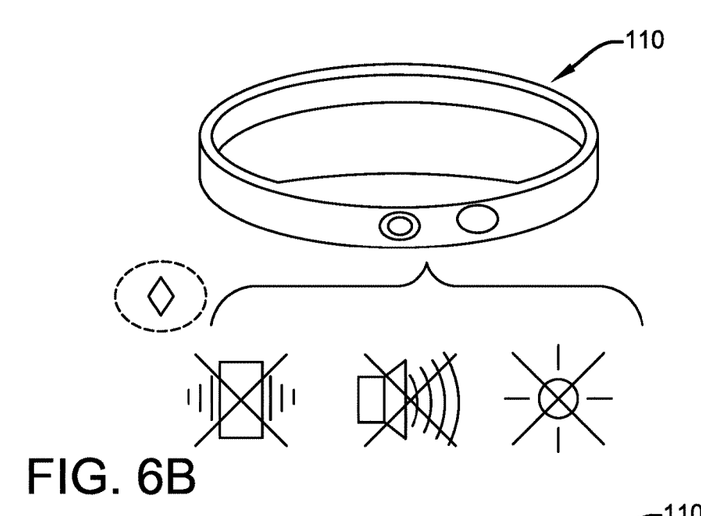
FIG. 6B illustrates one of the plurality of wireless transceiver devices of the present invention in a non-alert state in accordance with the disclosed architecture.
Figure 6C:
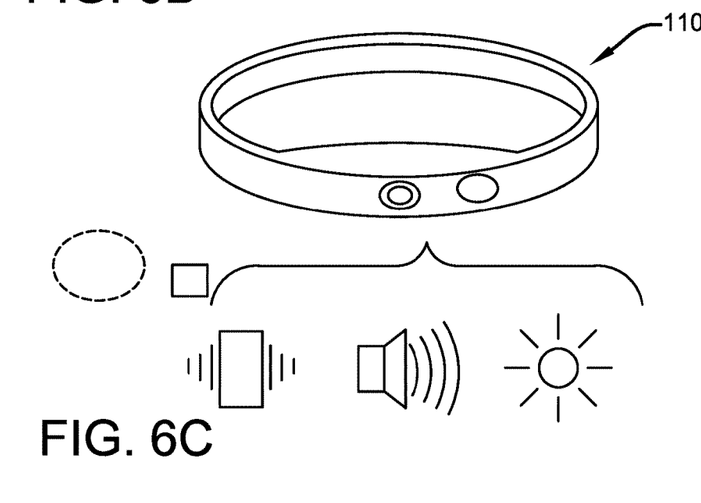
FIG. 6C illustrates one of the plurality of wireless transceiver devices of the present invention in an alert state of the present invention in accordance with the disclosed architecture.
Figure 7:
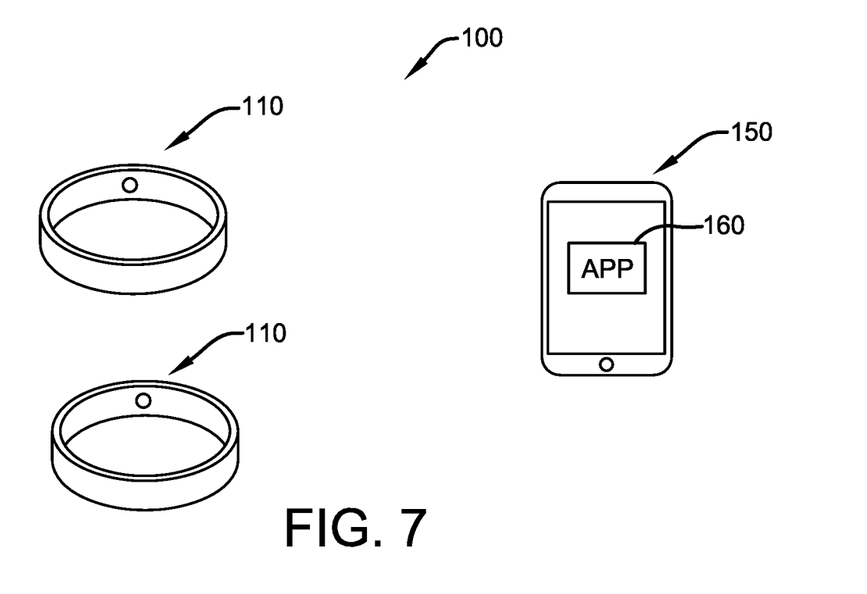
FIG. 7 illustrates a perspective view of the proximity separation alert system of the present invention further comprising a mobile application in accordance with the disclosed architecture.

To use the system 100, a user may pair each wireless transceiver device 110 to the other wireless transceiver devices 110 and any secondary client device 150. As illustrated in FIG. 7, the system 100 may further comprise a mobile application 160 for additionally alerting the user when one of the predetermined separation distances (D1 and 2) is achieved and storing any data collected by the wireless transceiver devices 110. As illustrated in FIG. 6B, when all of the wireless transceiver devices 110 are in range, the at least one alerting component 122, 124, and 126 in not activated and remains in a non-alert state. One of the wireless transceiver devices 110 is placed on or attached to a person, pet, or object to be tracked and a second wireless transceiver device 110 or the secondary client device 150 is retained by the user. As illustrated in FIG. 6A, if the person, pet, or object to be tracked is removed from the user by the predetermined first distance (D1), each wireless transceiver device 110 and the secondary client device 150 enters a first alert mode illustrated in FIG. 6C.

In the first alert mode, the at least one alerting component provides an alert such as a vibration, a blinking light pattern, an audible noise, of a combination thereof. If the person, pet, or object to be tracked is removed from the user by a predetermined second distance (D2), each wireless transceiver device 110 and the secondary client device 150 enters a second alert mode. In the second alert mode, the at least one alerting component provides an alert such as a vibration, a blinking light pattern, an audible noise, or a combination thereof that is different from the alert of the first alert mode. Additionally, the at least one alerting component 122, 124, and 126 can provide an alert in the event of a low battery, an abnormal temperature, or a sudden acceleration or deceleration. The secondary client device 150 may also be used to track the person, pet, or object to be tracked via GPS. Further, the illuminating component 124 may provide a light indication to warn that there is no power, adequate power, low power, etc.

Figure 3A:
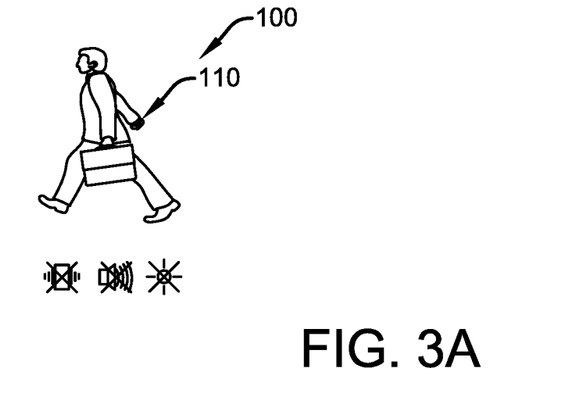
FIG. 3A illustrates a pair of the wireless transceiver devices of the proximity separation alert system of the present invention within a predefined distance in accordance with the disclosed architecture.
Figure 3B:
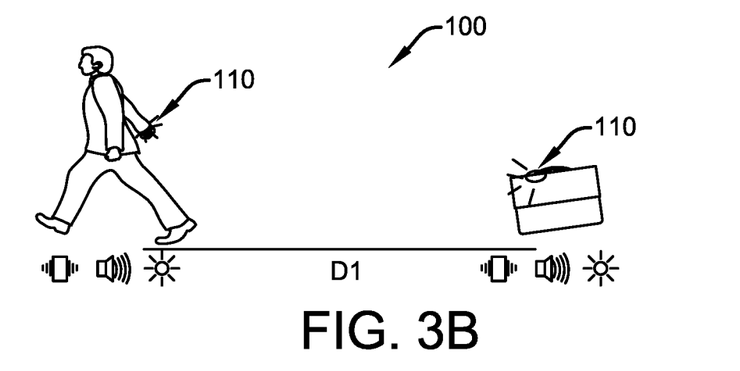
FIG. 3B illustrates the pair of the wireless transceiver devices of the proximity separation alert system of the present invention outside of the predefined distance of the present invention in accordance with the disclosed architecture.
Figure 3C:
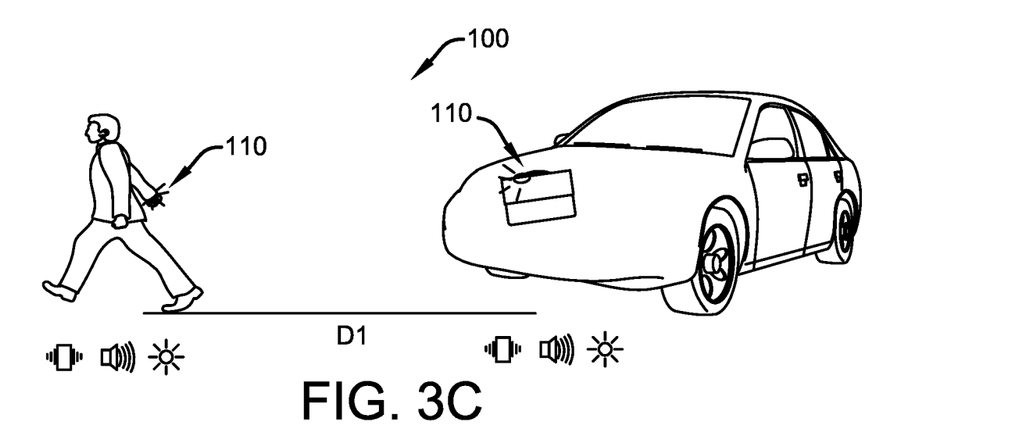
FIG. 3C illustrates the pair of the wireless transceiver devices of the proximity separation alert system of the present invention outside of the predefined distance of the present invention in accordance with the disclosed architecture.
Figure 4A:
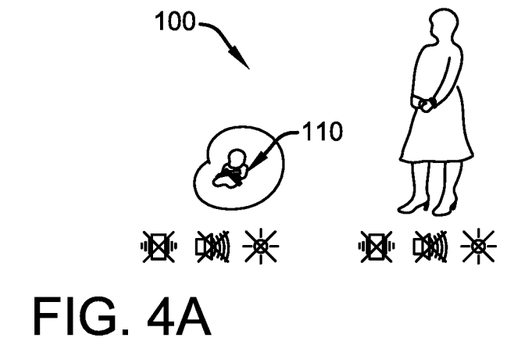
FIG. 4A illustrates a pair of the wireless transceiver devices of the proximity separation alert system of the present invention within a predefined distance in accordance with the disclosed architecture.
Figure 4B:
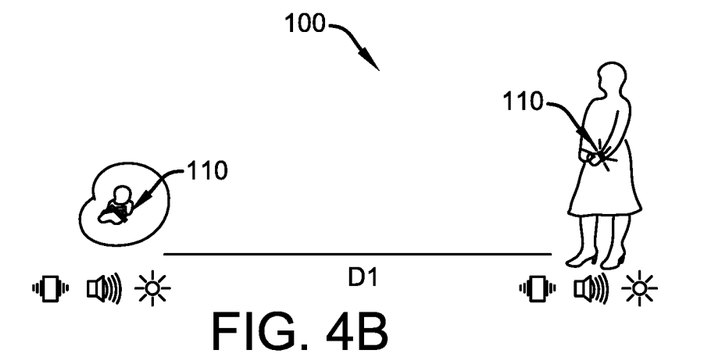
FIG. 4B illustrates the pair of the wireless transceiver devices of the proximity separation alert system of the present invention outside of the predefined distance of the present invention in accordance with the disclosed architecture.
Figure 4C:
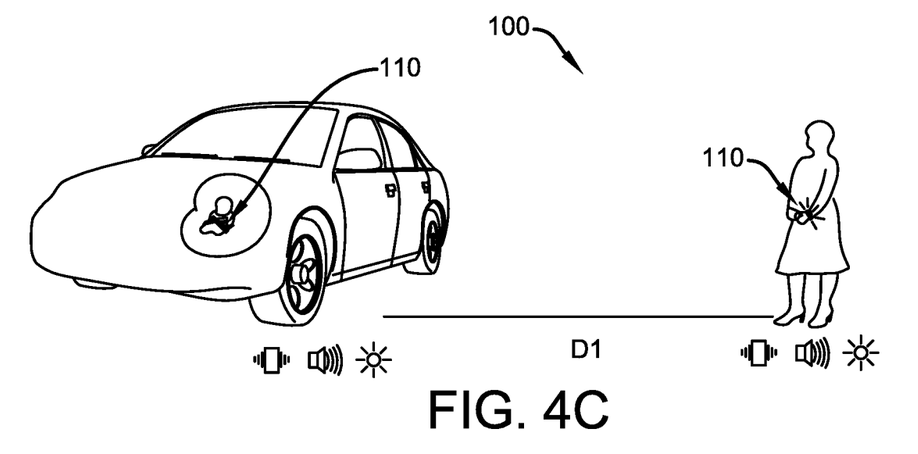
FIG. 4C illustrates the pair of the wireless transceiver devices of the proximity separation alert system of the present invention outside of the predefined distance of the present invention in accordance with the disclosed architecture.

As illustrated in FIGS. 3A-3C, a first wireless transceiver devices 110 is placed on the wrist of the user, and a second wireless transceiver device 110 is placed on a briefcase. When the user walks away from the briefcase by the predetermined first distance (D1), such as if left behind accidently in a car, both of the wireless transceiver devices 110 enter an alert state to signal the user that the briefcase was left behind. In another example as illustrated in FIGS. 4A-4C, the first wireless transceiver devices 110 is placed on the wrist of a parent, and the second wireless transceiver device 110 is placed on a car seat with a baby. When the user walks away from the baby in the car seat by the predetermined first distance (D1), such as if left behind accidently in a car, both of the wireless transceiver devices enter an alert state to signal the parent that the baby was left behind.

The proximity separation alert system 100 is able to differentiate if there is a connection between any paired device 110 and 150, or if a connection cannot be established. If there is no connection, one of the devices 110 and 150 can alert the user. In one example, the predefined first distance (D1) may be approximately between 10-20 meters and the predefined second distance (D2) may be approximately between 30-50 meters, although either range may be increased or decreased as desired.

In the extended range of the predefined second distance (D2), when any paired device 110 and 150 is out of short distance separation range (D1) from any other of the paired devices 110 and 150, the BLE connection range is increased. At the extended range mode, the short distance range separation alert triggered at the predefined first distance (D1) continues. Next, the GPS modular 128 may be activated. Similarly, the temperature sensor 120 may be activated and GPS data, temperature, remaining battery capacity data, and timestamp may be collected in an Event Log file. This data will be available for the paired smart phone, smart watch, or computer to display.

The mobile software application 160 on the smart phone, smart watch or computer can display map, temperature, device unit identification (UID), and timestamp when those information are available from the device 110 that's outside of the short distance separation range (D1). Additional features of the mobile software application 160 may include a display of the last known location as an arrow on the phone or post the last known location on map; an Event Log of when the device 110 is being charged, and when it was removed from charger; an Event Log of when device 110 goes into out of short distance separation range (D1) mode; an Event Log of when device 110 goes into out of the long distance separation range (D2) mode; Log files can be updated every approximately 20 seconds and recorded in the memory; Log files may be saved in JSON or XML, format; and a backup copy of the Event Log may be saved to prevent from file corruption.

It is contemplated that the proximity separation alert system 100 constructed in accordance with the present invention will be tailored and adjusted by those of ordinary skill in the art to accommodate various levels of performance demand imparted during actual use. Accordingly, while this invention has been described by reference to certain specific embodiments and examples, it will be understood that this invention is capable of further modifications. This application is, therefore, intended to cover any variations, uses or adaptations of the invention following the general principles thereof, and including such departures from the present disclosure as come within known or customary practice in the art to which this invention pertains and fall within the limits of the appended claims.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A proximity separation alert system comprising:
   a plurality of wireless transceiver devices each comprising a Bluetooth component, a processor, a memory, and at least one alerting component;
   a rechargeable battery in electrical communication with a micro-USB port;
   a mobile application in wireless communication with each of the plurality of wireless transceiver devices and that stores a set of data collected by the plurality of wireless transceiver devices; and
   a secondary client device pairable with each of the plurality of wireless transceiver devices and having the mobile application installed thereon;
   wherein each wireless transceiver device is pairable with the other wireless transceiver devices and the mobile application is configured to provide a first alert when a first selectable separation distance between any two of the wireless transceiver devices or any of the plurality of wireless transceiver devices and the secondary client device is breached;
   wherein the mobile application is configured to provide a second alert when a second selectable separation distance between any two of the wireless transceiver devices or any of the plurality of wireless transceiver devices and the secondary client device is breached; and
   further wherein said first alert is different from said second alert.

2. The proximity separation alert system of claim 1, wherein each at least one alerting component comprises a vibration component.

3. The proximity separation alert system of claim 1, wherein each at least one alerting component comprises an illuminating component.

4. The proximity separation alert system of claim 1, wherein each at least one alerting component comprises a speaker.

5. The proximity separation alert system of claim 1 further comprising a mobile application for alerting a user when any of the predetermined separation distances is achieved.

6. The proximity separation alert system of claim 1, wherein each wireless transceiver device further comprises a GPS tracker.

7. The proximity separation alert system of claim 1, wherein each memory is configured to retain separation and alert data collected from the respective wireless transceiver device.

8. A proximity separation alert system comprising:
   a plurality of wireless transceiver devices each comprising a Bluetooth component, a processor, a memory, and at least one alerting component;
   a rechargeable battery in electrical communication with a micro-USB port;
   a mobile application in wireless communication with each of the plurality of wireless transceiver devices and that stores a set of data collected by the plurality of wireless transceiver devices;
   a battery illuminating component that provides a light indication when any of the plurality of wireless transceiver devices has a low, a full, or a dead battery;
   a secondary client device pairable with each of the plurality of wireless transceiver devices and having the mobile application installed thereon;

wherein each wireless transceiver device is pairable with the other wireless transceiver devices and the mobile application is configured to provide a first alert when a first selectable separation distance between any two of the wireless transceiver devices or any of the plurality of wireless transceiver devices and the secondary client device is breached;

wherein the mobile application is configured to provide a second alert when a second selectable separation distance between any two of the wireless transceiver devices or any of the plurality of wireless transceiver devices and the secondary client device is breached;

wherein said second selectable separation distance is greater than said first selectable separation distance; and further wherein said first alert is different from said second alert.

9. The proximity separation alert system of claim 8, wherein each at least one alerting component comprises a vibration component.

10. The proximity separation alert system of claim 8, wherein each at least one alerting component comprises an illuminating component.

11. The proximity separation alert system of claim 8, wherein each at least one alerting component comprises a speaker.

12. The proximity separation alert system of claim 8 further comprising a mobile application for alerting a user when any of the predetermined separation distances is achieved.

13. The proximity separation alert system of claim 8, wherein each wireless transceiver device further comprises a GPS tracker.

14. The proximity separation alert system of claim 8, wherein each memory is configured to retain separation and alert data collected from the respective wireless transceiver device.

15. A proximity separation alert system comprising:
a plurality of wireless transceiver devices each comprising a Bluetooth component, a processor, a memory, and at least one alerting component;
a rechargeable battery in electrical communication with a micro-USB port;
a mobile application in wireless communication with each of the plurality of wireless transceiver devices and that stores a set of data collected by the plurality of wireless transceiver devices, wherein the mobile application stores a set of data collected by the plurality of wireless transceiver devices; and
a secondary client device pairable with each of the plurality of wireless transceiver devices and having the mobile application installed thereon;

wherein each wireless transceiver device is pairable with the other wireless transceiver devices and the mobile application is configured to provide a first alert when a first selectable separation distance between any two of the wireless transceiver devices or any of the plurality of wireless transceiver devices and the secondary client device is breached;

wherein the mobile application is configured to provide a second alert when a second selectable separation distance between any two of the wireless transceiver devices or any of the plurality of wireless transceiver devices and the secondary client device is breached;

wherein said second selectable separation distance is greater than said first selectable separation distance;

wherein said first alert is different from said second alert; and further wherein said first selectable separation distance is between 10-20 meters and said second selectable separation distance is between 30-50 meters.

16. The proximity separation alert system of claim 15, wherein each at least one alerting component comprises a vibration component.

17. The proximity separation alert system of claim 15, wherein each at least one alerting component comprises an illuminating component.

18. The proximity separation alert system of claim 15, wherein each at least one alerting component comprises a speaker.

19. The proximity separation alert system of claim 15 further comprising a mobile application for alerting a user when any of the predetermined separation distances is achieved.

20. The proximity separation alert system of claim 15, wherein each wireless transceiver device further comprises a GPS tracker.

* * * * *